United States Patent [19]

Griffey

[11] Patent Number: 4,855,864
[45] Date of Patent: Aug. 8, 1989

[54] HIGH VOLTAGE SHUTDOWN CIRCUIT WITH BRIGHTNESS TRACKING

[75] Inventor: Donald E. Griffey, Skokie, Ill.

[73] Assignee: Zenith Electronics Corporation, Glenview, Ill.

[21] Appl. No.: 223,034

[22] Filed: Jul. 22, 1988

[51] Int. Cl.$^4$ .............................................. H04N 5/48
[52] U.S. Cl. ...................................... 361/91; 358/243; 361/38
[58] Field of Search ....................... 358/190, 242, 243; 361/35, 38, 88, 90, 91, 92

[56] References Cited

U.S. PATENT DOCUMENTS

| | | | |
|---|---|---|---|
| 3,804,981 | 4/1974 | Avins | 358/243 |
| 3,873,767 | 3/1975 | Okada et al. | 358/243 |
| 3,980,822 | 9/1976 | Suzuki et al. | 358/243 |

Primary Examiner—A. D. Pellinen
Assistant Examiner—Jeffrey A. Gaffin

[57] ABSTRACT

A high voltage shutdown circuit that tracks with brightness changes in the CRT. An ABL (automatic brightness level) signal is applied to adjust the conduction point of a latch transistor that is connected in a trigger arrangement with a zener diode and driven by a sensing winding on a high voltage transformer. The ABL voltage is applied to an inverting transistor and an opposite polarity potential is developed across a capacitor connected in series with the latch transistor. Because of the loading on the high voltage generating means, the voltage across the sensing winding does not accurately reflect the actual high voltage at the CRT and the circuit prevents premature high voltage shutdown under high beam current conditions.

6 Claims, 1 Drawing Sheet

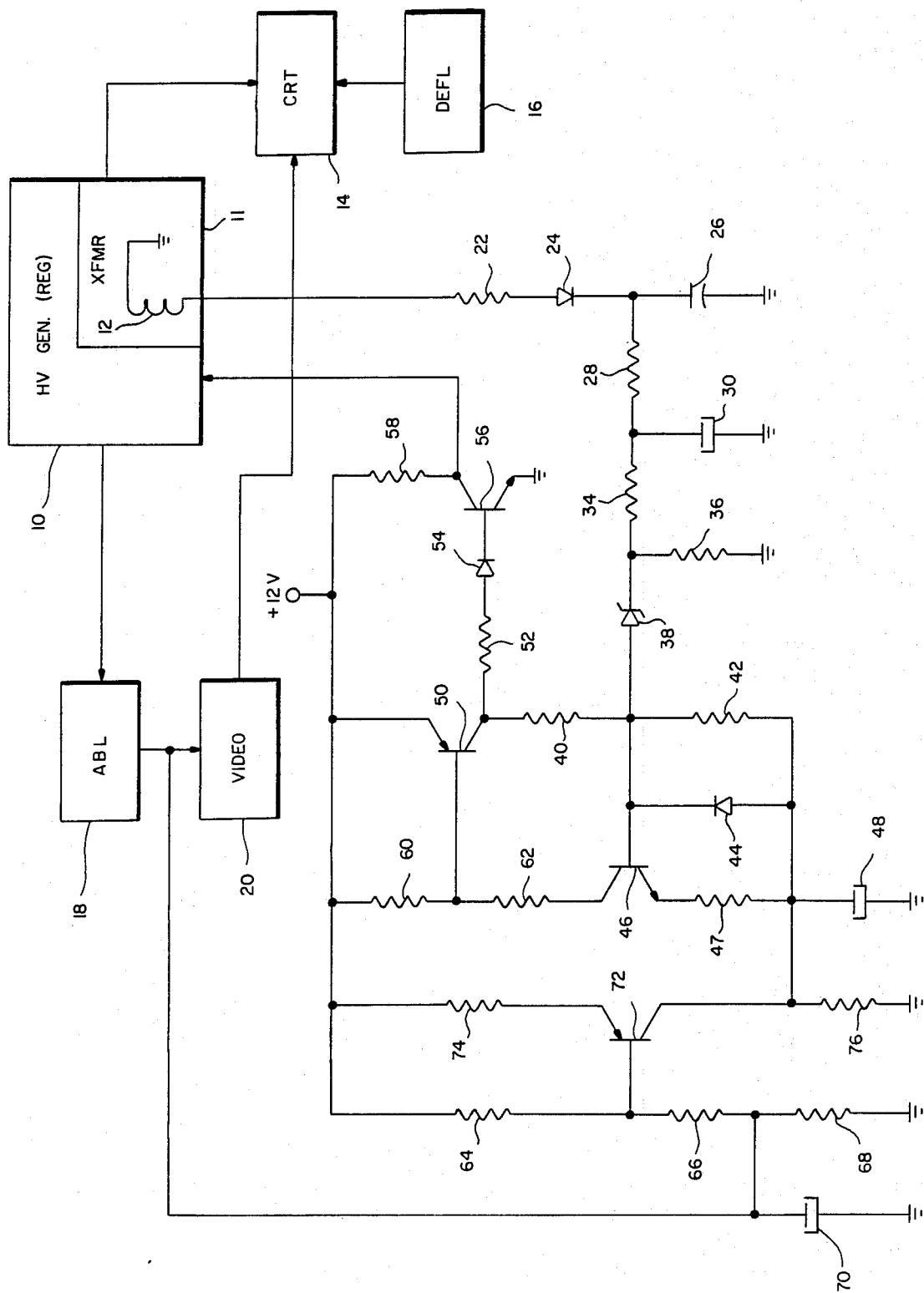

HIGH VOLTAGE SHUTDOWN CIRCUIT WITH BRIGHTNESS TRACKING

BACKGROUND OF THE INVENTION AND PRIOR ART

This invention relates in general to high voltage shutdown circuits for cathode ray tubes (CRTs) and in particular to such shutdown circuits that are utilized in systems having regulated high voltage supplies and separate deflection systems.

In projection monitors and television receivers, the light from the individual color projection CRTs is projected to a physically displaced viewing screen. In order to produce acceptable illumination, the projection CRTs are driven "hard", i.e. at large beam current levels, which requires not only high levels of high voltage but fairly "stiff" (regulated) high voltage supplies. To limit x-radiation emission from the supplies and from the CRT, the high voltage is generally kept below a safe value of about 31KV.

A high voltage shutdown circuit is provided for sensing the voltage across the high voltage transformer and for initiating trigger means when that high voltage exceeds a particular value, i.e. when the actual voltage will be in excess of the safe level. Operation of the trigger means develops a shutdown signal that is effective to disable the high voltage supply. High voltage shutdown circuits are included to guard against abnormal operating conditions as well as circuit failures that would result in excessive high voltage levels.

As mentioned, increases in CRT brightness levels require that more energy be supplied from the high voltage system. In regulated high voltage systems in particular, the peak amplitude of the voltage developed across the high voltage transformer is increased significantly in order to supply the additional energy. While the high voltage present at the CRT is a function of the maximum voltage across the high voltage transformer, the increased brightness results in significant beam current loading on the high voltage circuit. While the regulator is increasing the voltage across the high voltage transformer to enable it to supply the additional energy demanded for the high brightness display, the actual high voltage developed no longer bears the same relationship to the voltage across the transformer. In short, while the voltage across the transformer certainly rises, the rise is not necessarily indicative of a proportional increase in developed high voltage. The result is that with an increased display brightness in such a system, the voltage spread between normal operation and high voltage shutdown is effectively narrowed and premature high voltage shutdown can occur.

The circuit of the present invention corrects such premature high voltage shutdown by developing a tracking voltage that is responsive to the brightness or energy level of the CRT and using that tracking voltage to adjust the operating point of the triggering means accordingly.

OBJECTS OF THE INVENTION

A primary object of the invention is to provide a novel high voltage shutdown circuit.

Another object of the invention is to provide a high voltage shutdown circuit that is compensated for CRT brightness levels.

BRIEF DESCRIPTION OF THE DRAWINGS

These and other objects and advantages of the invention will be apparent upon reading the following description in conjunction with the drawing, the single figure of which is a partial schematic diagram of a high voltage shutdown circuit constructed in accordance with the invention.

DESCRIPTION OF THE PREFERRED EMBODIMENT

Referring to the figure, a block 10 is indicated as including a regulated high voltage generating means with a high voltage transformer 11 identified as having a shutdown winding 12 associated therewith. High voltage generating means 10 supplies high voltage energy to a CRT 14 which is supplied with deflection signals from a deflection means 16 and with video signals from a video means 20. An ABL (automatic brightness level) circuit 18 is supplied from high voltage generating means 10 and is coupled to video means 20. The above circuit elements are well known in the art and all have been in use for a number of years. The ABL voltage is developed from the high voltage transformer and is used to control the brightness level of the video signal to prevent "blooming" of the picture elements on the CRT.

A high voltage shutdown circuit is coupled to shutdown winding 12 which develops a signal voltage that is directly related to the voltage across high voltage transformer 11. In this connection, shutdown winding 12 comprises a sensing means for sensing the voltage magnitude across transformer 11. Shutdown winding 12 is coupled through a resistor 22 and a diode 24 to ground through a capacitor 26. The junction of diode 24 and capacitor 26 is connected to a voltage divider comprising series connected resistors 28, 34 and 36. The junction of resistors 28 and 34 is connected to ground through an electrolytic capacitor 30 and the junction of resistors 34 and 36 is connected to the cathode of a zener diode 38. The anode of zener diode 38 is connected to the base of an NPN latch transistor 46 that has its collector connected through series connected resistors 62 and 60 to a +12V voltage source. The emitter of transistor 46 is connected in series with a resistor 47 and an electrolytic capacitor 48. A diode 44 and a resistor 42 are connected in parallel between the base of transistor 46 and capacitor 48.

The junction of resistors 60 and 62 is connected to the base of a PNP transistor 50 that has its emitter connected to +12V and its collector connected, through a resistor 40, to the base of latch transistor 46. Transistor 46 and zener diode 50 and their associated components comprise trigger means that operate in response to the voltage across sensing winding 12 to drive latch transistor 46 (and its associated transistor 50) into conduction and to thereby develop a shutdown signal at the collector of transistor 50. The shutdown signal is applied through a resistor 52 and a diode 54 to the base of a shutdown transistor 56 that has its emitter connected to ground and its collector connected through a load resistor 58 to +12V. The collector of shutdown transistor 56 is coupled to high voltage generating means 10 for shutting down (disabling) the high voltage generating means when transistor 56 is driven conductive.

The tracking means of the invention comprises an arrangement including a voltage divider consisting of three resistors 64, 66 and 68 connected in series between +12V and ground. The ABL voltage from ABL circuit 18 is applied to the junction of resistors 66 and 68 and to an electrolytic capacitor 70. An inverting transistor 72 has its base connected to the junction of resistors 64 and 66. The emitter of transistor 72 is connected through a resistor 74 to +12V and its collector is connected to ground through a resistor 76 that parallels capacitor 48.

In operation, the trigger means is arranged to initiate conduction in latch transistor 46 and associated transistor 50 when the voltage across shutdown winding 12 reaches the level at which zener diode 38 breaks down. This voltage is selected to correspond to approximately 34KV at CRT 14, well above normal operating high voltage of 31.5KV, so that nuisance shutdown is avoided. As mentioned previously, under high brightness conditions, the loading imposed by the CRT on the high voltage generating system distorts the relationship between the voltage developed across shutdown winding 12 and the actual high voltage that is developed and appears at CRT 14.

The voltage developed by ABL circuit 18 is related to the beam current in CRT 14 and as the beam current increases, the ABL voltage becomes more negative. Consequently, when this voltage is supplied to the voltage divider of resistors 64, 66 and 68, the potential at the base of transistor 72 falls with increasing ABL voltage. That is when the ABL voltage becomes more negative, the voltage developed across resistor 64 increases and the emitter of transistor 72 is more heavily forward biased. Conduction current increases in transistor 72 and the voltage developed across load resistor 76 increases. Transistor 72 effectively inverts the ABL voltage and the portion of the inverted voltage that is developed across resistor 76 is a function of the ratio of resistors 74 and 76. The increased voltage across resistor 76 is applied across electrolytic capacitor 48 and serves to raise the emitter voltage of latch transistor 46. The result is that an increased positive voltage from shutdown winding 12 is required to cause the zener diode 38 to conduct and cause conduction in latch transistor 46. Thus the circuit automatically compensates for the effect of the increased beam curent in CRT 14 on the differential, or operating, voltage range between high voltage shutdown and normal video performance. Consequently, the premature high voltage shutdown of the prior art circuit is avoided without compromising the actual high voltage shutdown performance of the system.

What is claimed is:

1. A high voltage system comprising:
   a cathode ray tube;
   a regulated high voltage generating means including a high voltage transformer for supplying energy to said cathode ray tube;
   sensing means for monitoring the voltage across said transformer;
   trigger means coupled to said sensing means for developing a shutdown signal; and
   tracking means for adjusting the operation of said trigger means as a function of energy supplied to said cathode ray tube by said regulated high voltage generating means.

2. The system of claim 1 wherein said sensing means comprises a winding on said high voltage transformer.

3. The system of claim 2 wherein said trigger means include:
   a zener diode and a latch transistor for developing said shutdown signal, and means for biasing said latch transistor; and wherein said tracking means include:
   a source of automatic brightness limiting voltage; and
   means for changing the bias on said latch transistor in response to said automatic brightness limiting voltage.

4. The system of claim 3 wherein said bias means includes a capacitor connected in series with said latch transistor and wherein said changing means includes inverting transistor means for developing a tracking voltage of opposite polarity to said automatic brightness limiting voltage and for applying said tracking voltage to said capacitor.

5. A high voltage system comprising:
   a cathode ray tube;
   regulated high voltage generating means including a high voltage transformer for supplying energy to said cathode ray tube, said high voltage transformer including a sensing winding for sensing the voltage developed across said high voltage transformer;
   means for developing an automatic brightness limiting voltage that varies as a function of the energy supplied to said cathode ray tube;
   a latch transistor for producing a shutdown signal;
   means for biasing said latch transistor;
   a zener diode coupled between said sensing winding and said latch transistor for driving said latch transistor into conduction when the voltage across said sensing winding reaches a predetermined level; and
   means responsive to said automatic brightness limiting voltage for adjusting the bias on said latch transistor as a function of the energy supplied to said cathode ray tube by said high voltage generating means.

6. The system of claim 5 wherein said bias means includes a capacitor coupled in circuit with said latch transistor and said adjusting means includes an inverting transistor for receiving said automatic brightness limiting voltage and for developing an opposite polarity voltage across said capacitor in response thereto.

* * * * *